(12) United States Patent
Takahashi

(10) Patent No.: US 11,499,574 B2
(45) Date of Patent: Nov. 15, 2022

(54) FLUID LEAKAGE DETECTION DEVICE AND RECIPROCATING FLUID PRESSURE DEVICE

(71) Applicant: KYB Corporation, Tokyo (JP)

(72) Inventor: Yusuke Takahashi, Gifu (JP)

(73) Assignee: KYB CORPORATION, Tokyo (JP)

( * ) Notice: Subject to any disclaimer, the term of this patent is extended or adjusted under 35 U.S.C. 154(b) by 20 days.

(21) Appl. No.: 16/961,958

(22) PCT Filed: Jan. 16, 2019

(86) PCT No.: PCT/JP2019/001019
§ 371 (c)(1),
(2) Date: Jul. 14, 2020

(87) PCT Pub. No.: WO2019/146459
PCT Pub. Date: Aug. 1, 2019

(65) Prior Publication Data
US 2020/0347856 A1 Nov. 5, 2020

(30) Foreign Application Priority Data
Jan. 29, 2018 (JP) .............................. JP2018-012563

(51) Int. Cl.
*F15B 15/14* (2006.01)
*F15B 20/00* (2006.01)

(52) U.S. Cl.
CPC ........ *F15B 15/1461* (2013.01); *F15B 20/005* (2013.01)

(58) Field of Classification Search
CPC .. F15B 15/1461; F15B 19/005; F15B 20/005; F16J 15/004; F17D 5/02; G01R 31/374; G01R 31/3835
See application file for complete search history.

(56) References Cited

U.S. PATENT DOCUMENTS 3,943,717 A * 3/1976 Schexnayder ......... F16J 15/004
60/453
4,065,852 A * 1/1978 Bowbin .................. F16F 9/362
384/16
2007/0272077 A1* 11/2007 Perkins ............... F15B 15/1461
92/161

(Continued)

FOREIGN PATENT DOCUMENTS

JP 2016-045068 A 4/2016

*Primary Examiner* — Michael Leslie
*Assistant Examiner* — Matthew Wiblin
(74) *Attorney, Agent, or Firm* — Rabin & Berdo, P.C.

(57) ABSTRACT

A fluid leakage detection device includes: a rod seal provided in a cylinder head, a rod seal being configured to seal an annular gap between a piston rod and the cylinder head; a detection seal configured to seal an annular gap, a detection seal being configured to partition the detection space together with the rod seal; a communication passage in communication with the detection space; a pressure sensor configured to detect the pressure of the working oil guided through the communication passage; and a relief valve configured to release the pressure in the communication passage, wherein the detection seal is provided between the rod seal and a dust seal, the dust seal being configured to seal the annular gap by being provided in the cylinder head so as to face the outside of the cylinder tube.

16 Claims, 3 Drawing Sheets

(56) References Cited

U.S. PATENT DOCUMENTS

2008/0272554 A1* 11/2008 Nagel .................... F16J 15/004
                                                        277/434
2017/0108399 A1* 4/2017 Rhee ................... G01M 13/005
2019/0048902 A1* 2/2019 Ooki ................... G01M 3/2815

* cited by examiner

US 11,499,574 B2

FLUID LEAKAGE DETECTION DEVICE AND RECIPROCATING FLUID PRESSURE DEVICE

TECHNICAL FIELD

The present invention relates to a fluid leakage detection device and a reciprocating fluid pressure device.

BACKGROUND ART

JP2016-45068A discloses a fluid leakage detection unit that includes: a rod seal that is provided on an outer circumference of a shaft and that seals working fluid in a fluid-side space over the outer circumference of the shaft; a dust seal that is provided on the outer circumference of the shaft and that is arranged on the opposite side from the rod seal in the axial direction of the shaft in the fluid-side space; and an alert transmitting unit that transmits an alert in response to a pressure increase between the rod seal and an irregular-shaped dust seal when leakage of the working fluid through the rod seal has been caused.

SUMMARY OF INVENTION

With the fluid leakage detection device disclosed in JP2016-45068A, by detecting the pressure of the working fluid in a detection space partitioned between the rod seal and the dust seal, the leakage of the working fluid caused by a damage of the rod seal is detected.

In the fluid leakage detection device disclosed in JP2016-45068A, if the dust seal partitioning the detection space is damaged, the working fluid in the detection space leaks outside, and it becomes unable to detect the leakage through the rod seal. Thus, in the fluid leakage detection device, a detection accuracy for the leakage relies on a durability and/or sealing property of the dust seal partitioning the detection space.

In order to improve the detection accuracy for the leakage, for example, the seal member that partitions the detection space is required to have the sealing property such that a high-pressure fluid does not leak outside easily even if the high-pressure fluid leaks out through the rod seal and a high pressure is exerted to the seal member. In addition, it is desired that a relatively stretchable material be used for this seal member such that, even if a damage is caused on a surface of the cylinder rod, the seal member follows the surface profile of the cylinder rod to seal the outer circumference of the cylinder rod.

On the other hand, because the dust seal is a seal for preventing invasion of the dusts from the outside by scraping out the dusts adhered to the surface of the piston rod, it is desired that a relatively hard material be used for the dust seal. If the dust seal is formed of the relatively soft and stretchable material, the dusts adhered to the piston rod cannot be effectively scraped out.

Therefore, in a case in which the detection space is partitioned by the dust seal as described in JP2016-45068A, the dust seal is required to have two types of abilities, i.e. an ability to detect the leakage of liquid and an ability to prevent the invasion of foreign matters. However, because it is difficult to achieve both abilities simultaneously, it becomes difficult to sufficiently improve the detection accuracy for the leakage of the liquid.

An object of the present invention is to improve a detection accuracy for leakage of liquid of a liquid leakage detection device.

According to one aspect of the present invention, a fluid leakage detection device for detecting leakage of working fluid from between a piston rod extending from a cylinder tube and a cylinder head provided on the cylinder tube, the piston rod being inserted into the cylinder head, the fluid leakage detection device includes: a rod seal provided in the cylinder head, the rod seal being configured to seal a gap between the piston rod and the cylinder head; a detection space formed for detecting the leakage of the working fluid; a detection seal provided in the cylinder head, the detection seal being configured to partition the detection space together with the rod seal; a communication passage in communication with the detection space; a detection unit configured to detect the working fluid guided through the communication passage; and a relief valve configured to release pressure in the communication passage by being opened when the pressure in the communication passage reaches a relief pressure, wherein the detection seal is provided between the rod seal and a dust seal, the dust seal being configured to seal the gap by being provided in the cylinder head so as to face outside of the cylinder tube.

DESCRIPTION OF EMBODIMENT

A fluid leakage detection device 100 according to an embodiment of the present invention and a hydraulic cylinder 1 serving as a reciprocating fluid pressure device provided with the fluid leakage detection device 100 will be described below with reference to the drawings.

Figure 1:
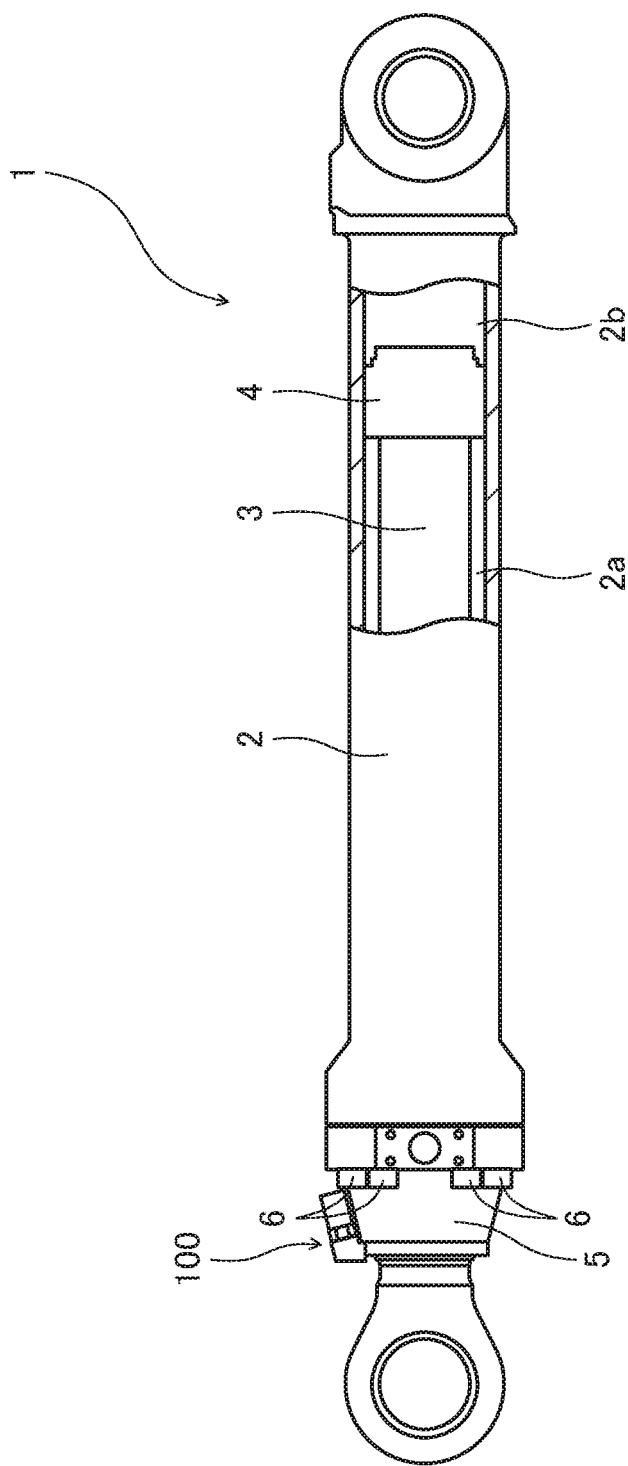
FIG. 1 is a partial sectional view showing a hydraulic cylinder according to an embodiment of the present invention.

As shown in FIG. 1, the hydraulic cylinder 1 is provided with a cylindrical cylinder tube 2, a piston rod 3 that is inserted into the cylinder tube 2, and a piston 4 that is provided on a base end of the piston rod 3. The piston 4 is provided so as to be freely slidable along an inner circumferential surface of the cylinder tube 2. An interior of the cylinder tube 2 is partitioned by the piston 4 into a rod side chamber 2a and a counter-rod-side chamber 2b.

The piston rod 3 has a tip end extending from an open end of the cylinder tube 2. As working oil is selectively guided from a hydraulic pressure source (not shown) to the rod side chamber 2a or the counter-rod-side chamber 2b, the piston rod 3 is moved relative to the cylinder tube 2. As a result, the hydraulic cylinder 1 is extended/contracted.

A cylinder head 5 into which the piston rod 3 is inserted is provided on the open end of the cylinder tube 2. The cylinder head 5 is fastened to the open end of the cylinder tube 2 by using a plurality of bolts 6.

The fluid leakage detection device 100 will be specifically described below with reference to FIG. 2.

The fluid leakage detection device 100 is provided with: a rod seal 10 that is provided in the cylinder head 5 for sealing a space having an annular shape (hereinafter referred to as "an annular gap 8") between an outer circumferential surface of the piston rod 3 and an inner circumferential surface of the cylinder head 5; a detection seal 11 that is provided in the cylinder head 5 for sealing the annular gap 8 and partitioning a detection space 20 together with the rod seal 10; a communication passage 21 in communication with the detection space 20; a pressure sensor 30 serving as a detection unit for detecting the pressure of the working oil that has been guided through the communication passage 21; a relief valve 40 that is opened to release the pressure in the communication passage 21 when the pressure in the communication passage 21 reaches a relief pressure; and a housing 50 for accommodating the pressure sensor 30 and the relief valve 40.

Figure 2:
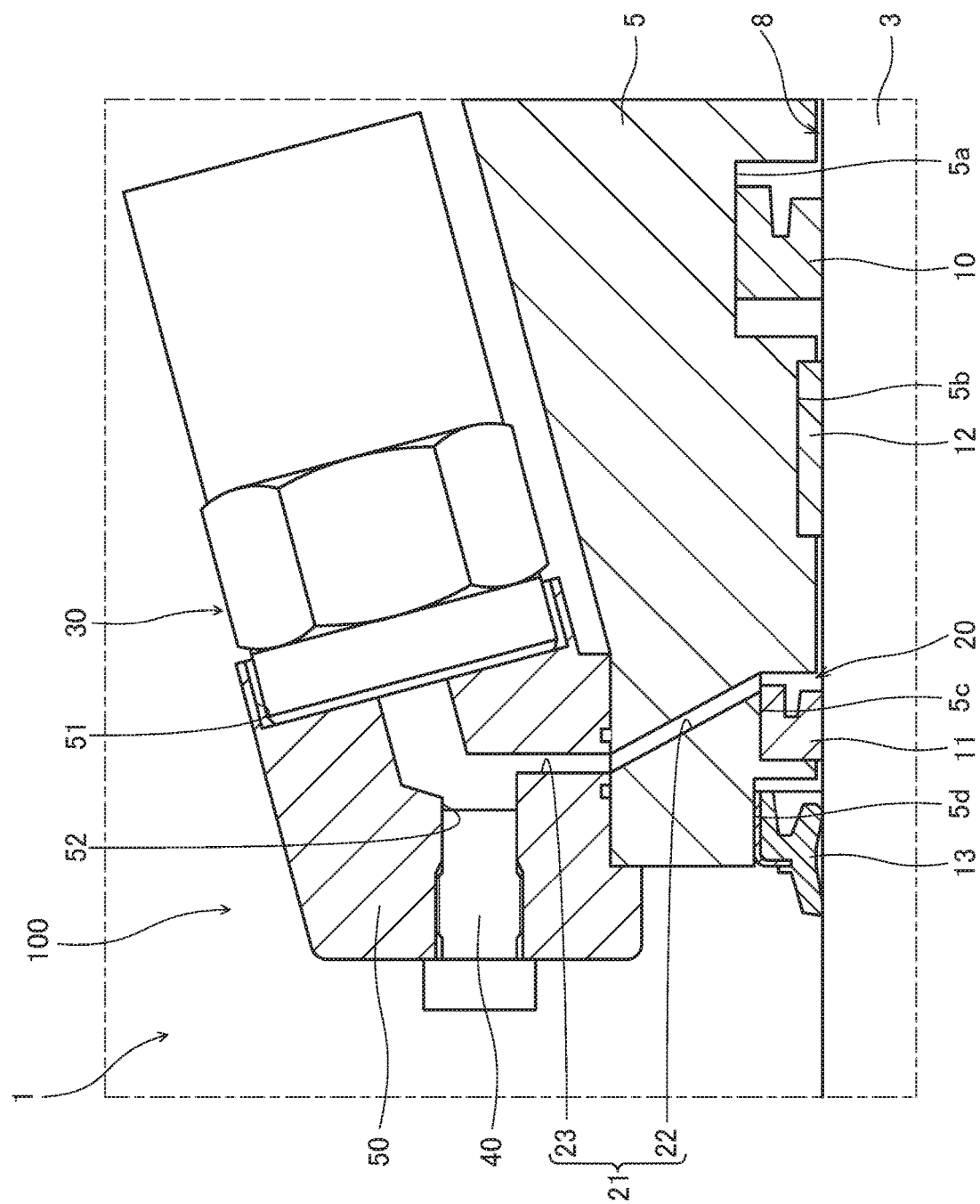
FIG. 2 is an enlarged sectional view showing a fluid leakage detection device according to the embodiment of the present invention.

As shown in FIG. 2, in the inner circumference of the cylinder head 5, the rod seal 10, a bush 12, the detection seal 11, and a dust seal 13 are interposed in this order from the base end (the right side in FIG. 2) to the tip end side (the left side in FIG. 2). The rod seal 10, the bush 12, the detection seal 11, and the dust seal 13 are respectively received in annular grooves 5a, 5b, 5c, and 5d formed in the inner circumference of the cylinder head 5.

The bush 12 slides on the outer circumferential surface of the piston rod 3, thereby supporting the piston rod 3 such that the piston rod 3 is movable in the axial direction of the cylinder tube 2.

The rod seal 10 is compressed between the outer circumference of the piston rod 3 and an annular groove 5a of the inner circumference of the cylinder head 5, thereby sealing the annular gap 8. The rod seal 10 prevents leakage of the working oil in the rod side chamber 2a (see FIG. 1) to the outside. The rod seal 10 is a so-called U-packing.

In the above, although the bush 12 and the rod seal 10 are provided in the inner circumference of the cylinder head 5 in this order in the direction in which the hydraulic cylinder 1 contracts, they may be provided in the reverse order.

The dust seal 13 is provided in the cylinder head 5 so as to face the outside of the cylinder tube 2, and seals the annular gap 8. The dust seal 13 scrapes out dusts adhering to the outer circumferential surface of the piston rod 3, thereby preventing invasion of the dusts into the cylinder tube 2 from the outside.

Similarly to the rod seal 10, the detection seal 11 is compressed between the outer circumference of the piston rod 3 and an annular groove 5c of the inner circumference of the cylinder head 5, thereby sealing the annular gap 8. The detection seal 11 is provided between the rod seal 10 and the dust seal 13 and partitions the detection space 20 together with the rod seal 10. In other words, the detection space 20 is a space defined by the piston rod 3, the cylinder head 5, the rod seal 10, and the detection seal 11 (in this embodiment, the bush 12 in addition thereto). Similarly to the rod seal 10, the detection seal 11 is the U-packing.

The communication passage 21 is formed from the cylinder head 5 to the housing 50 so as to communicate with the detection space 20. The communication passage 21 has a first communication passage 22 that is formed in the cylinder head 5 so as to open to the detection space 20 and a second communication passage 23 that is formed in the housing 50 so as to communicate with the first communication passage 22. The working oil that has leaked out from the rod side chamber 2a through the rod seal 10 is guided to the communication passage 21 via the detection space 20.

The housing 50 is fixed to an end portion of the cylinder head 5 by being press-fitted. The housing 50 is further formed with a sensor receiving hole 51 that receives the pressure sensor 30 and a valve receiving hole 52 that receives the relief valve 40. The sensor receiving hole 51 and the valve receiving hole 52 respectively communicate with the second communication passage 23, and the valve receiving hole 52 communicates with the second communication passage 23 at the first communication passage 22 side (upstream side) relative to the sensor receiving hole 51.

The pressure sensor 30 is attached to the housing 50 such that a part of the pressure sensor 30 is received in the sensor receiving hole 51, and the pressure sensor 30 detects the pressure of the working oil that has been guided from the detection space 20 through the first communication passage 22 and the second communication passage 23. The pressure in the detection space 20 is increased along with the increase in an amount of the working oil that is leaking out from the rod side chamber 2a (see FIG. 1) through the annular gap 8 over the rod seal 10. Therefore, by measuring the pressure in the detection space 20 by using the pressure sensor 30, it is possible to know the leaking amount of the working oil.

The relief valve 40 is opened when the pressure of the working oil in the second communication passage 23 reaches a predetermined pressure (the relief pressure), and the working oil in the detection space 20 is discharged through the second communication passage 23 to the outside. With such a configuration, the pressure in the detection space 20 is limited to the relief pressure by the relief valve 40. Because it is possible to employ a known structure for the structure of the relief valve 40, detailed illustration and description thereof are omitted.

Next, the specific configuration of the seal member that is provided in the inner circumference of the cylinder head 5 and an operation of the fluid leakage detection device 100 will be described.

A sealing property of the rod seal 10 is deteriorated gradually as it is worn by the extending/contracting movement of the hydraulic cylinder 1, in other words, by the reciprocating movement of the piston rod 3. As the sealing property is deteriorated, the amount of the working oil leaking out from the rod side chamber 2a through the annular gap 8 between the outer circumference of the piston rod 3 and the inner circumference of the cylinder head 5 is increased. As the leaking amount of the working oil is increased, there is a risk in that the hydraulic cylinder 1 becomes unable to exhibit a desired performance. Thus, in order to grasp the degradation of the rod seal 10 and/or the deterioration of the property due to the leakage of the working oil, the leakage of the working oil is detected by the fluid leakage detection device 100 in the hydraulic cylinder 1.

The fluid leakage detection device 100 detects the leakage of the working oil on the basis of the pressure in the detection space 20 detected by the pressure sensor 30. Specifically, the pressure sensor 30 transmits a signal corresponding to the detected pressure to a processing unit (not shown) by a transmitter (not shown) in a wired or wireless manner. The processing unit determines a degraded state of the rod seal 10 on the basis of the detected pressure. When the detected pressure is equal to or lower than the preset threshold value (hereinafter referred to as "detection threshold value"), the processing unit determines that it has not reached the replacement timing of the rod seal 10. When the detected pressure exceeds the detection threshold value, the processing unit determines that it has reached the replacement timing of the rod seal 10, and an operator is notified that it has reached the replacement timing of the rod seal 10 by, for example, a warning lamp, etc. In the above, the detection threshold value is set as the pressure value lower than the relief pressure of the relief valve 40.

As described above, in the hydraulic cylinder 1, it is possible to notice the degradation of the rod seal 10 on the basis of the pressure detected by the pressure sensor 30 of the fluid leakage detection device 100. Therefore, it is possible to manage the replacement timing of the rod seal 10 with ease.

In the above, because the fluid leakage detection device 100 is a device for detecting the leakage of the working oil by detecting the pressure of the working oil in the detection space 20, there is a risk in that the leakage of the working oil cannot be detected if the working oil leaks outside from the detection space 20 over the detection seal 11 and the pressure in the detection space 20 is decreased. For example, when the pressure in the rod side chamber 2a is increased suddenly, and if the lifetime of the rod seal 10 has been expired or the rod seal 10 has been damaged, then the high-pressure working oil is guided into the detection space 20 and exerts pressure on the detection seal 11. In this case, there is a risk in that the sealing property of the detection seal 11 may be deteriorated by the high pressure. In addition, when a scratch, etc. is formed on the piston rod 3, the scratch may be transferred to the detection seal 11, and the working oil may leak out from the detection space 20 through the scratch. Therefore, for the fluid leakage detection device 100, it is required that the deterioration of the sealing property of the detection seal 11 due to the high pressure is prevented and that the detection seal 11 follows the outer circumferential surface profile of the piston rod 3 so as to come into close contact with the outer circumferential surface of the piston rod 3 (so called followability of the detection seal 11).

Thus, as described above, the fluid leakage detection device 100 is provided with the relief valve 40 that releases the pressure in the detection space 20 through the communication passage 21. When the pressure in the detection space 20 is increased until it reaches the relief pressure, the relief valve 40 is opened to release the pressure in the detection space 20. With such a configuration, the pressure in the detection space 20 is maintained at the pressure equal to or lower than the relief pressure. Thus, the pressure higher than the relief pressure is not exerted to the detection seal 11, and it is possible to suppress the deterioration of the sealing property due to high pressure.

In addition, because the detection space 20 is maintained at the pressure equal to or lower than the relief pressure by the relief valve 40, a high pressure resistance is not required for the detection seal 11. Thus, a degree of freedom for selecting a material for the detection seal 11 is improved, and so, it is possible to form the detection seal 11 by using the material having a high followability without concerning the pressure resistance. Therefore, it is possible to improve the detection accuracy for the fluid leakage by improving the sealing property of the detection seal 11.

Figure 3:
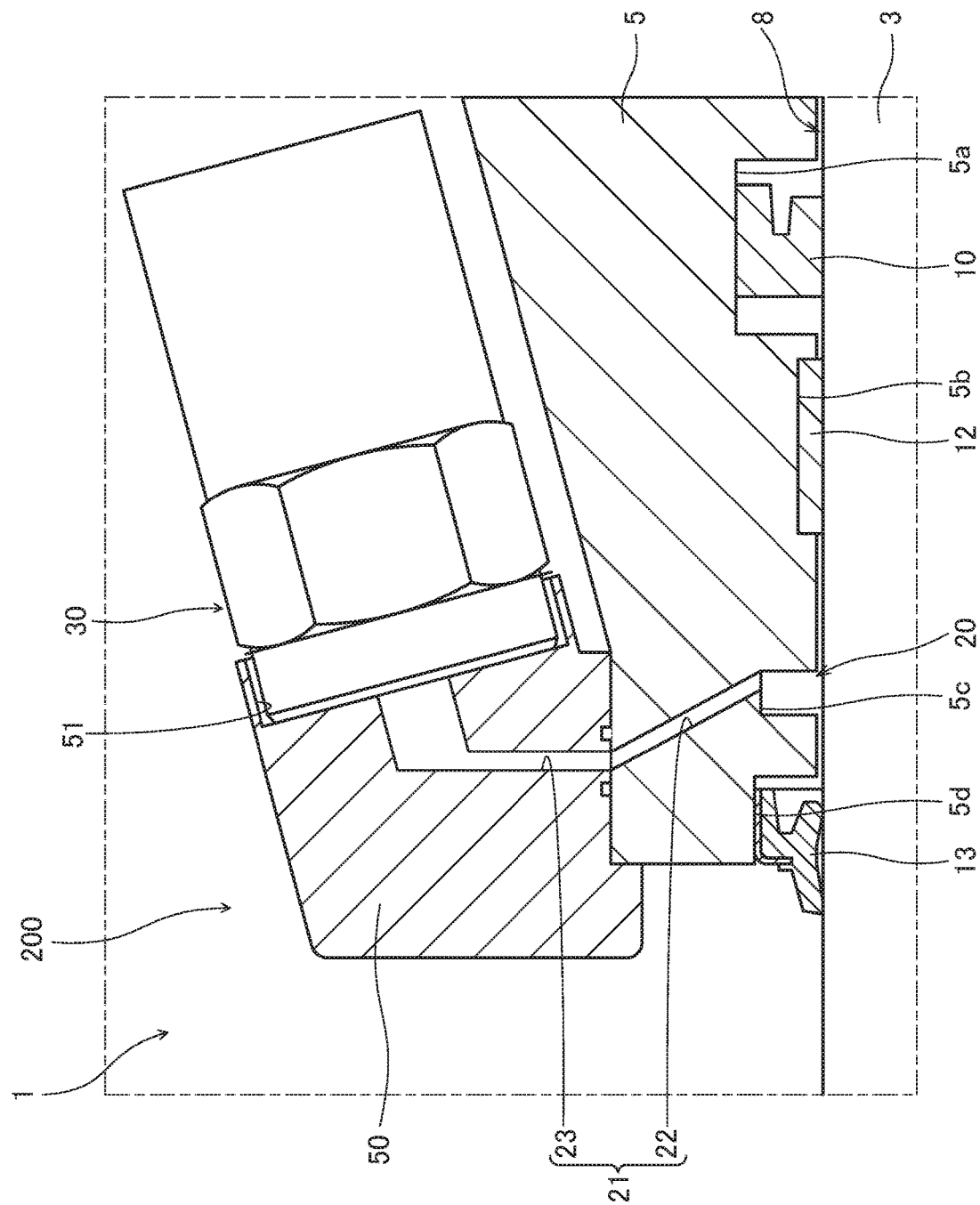
FIG. 3 is an enlarged sectional view showing the fluid leakage detection device according to a comparative example of the embodiment of the present invention.

Here, a fluid leakage detection device 200 according to a comparative example of this embodiment will be described with reference to FIG. 3. In the comparative example shown in FIG. 3, components that are the same as those in this embodiment are assigned the same reference numerals and detail descriptions thereof will be omitted.

In the fluid leakage detection device 200 according to the comparative example, the detection seal 11 as in this embodiment is not provided, and the detection space 20 is partitioned by the dust seal 13. In other words, in the fluid leakage detection device 200, the dust seal 13 also functions as the detection seal 11.

It is desirable that the dust seal 13 be made of a relatively hard material in order to scrape out the dusts adhered to the surface of the piston rod 3. In other words, if the dust seal 13 is made of a relatively soft stretchable material, the dusts adhered to the piston rod 3 cannot be effectively scraped out.

Thus, in a case in which the detection space 20 is partitioned by the dust seal 13 as described in the comparative example, it is difficult to form the dust seal 13 with a material having the high followability without compromising the function as the dust seal 13. Therefore, with the fluid leakage detection device 200 according to the comparative example, it is difficult to improve the detection accuracy for the fluid leakage.

In contrast, in the fluid leakage detection device 100, the detection space 20 is partitioned by the detection seal 11 that is a separate member from the dust seal 13. In the fluid leakage detection device 100, because the function as the dust seal 13 is not required for the detection seal 11, it is possible to form the detection seal 11 with the material having the high followability. Thus, even if a scratch, etc. is formed on the piston rod 3, the detection seal 11 can follow and come into close contact with the outer circumferential surface of the piston rod 3, and therefore, the deterioration of the sealing property is suppressed.

As described above, by partitioning the detection space 20 by the detection seal 11 that is separate from the dust seal 13 and by providing the relief valve 40 that releases the pressure in the detection space 20, the pressure resistance and the function as the dust seal needs not be considered upon selection of the material of the detection seal 11. Therefore, the degree of freedom for selecting the material for the detection seal 11 is improved, and it is possible to form the detection seal 11 by using the material only suitable for detection of the fluid leakage.

Specifically, for the material for the seal member, it is preferable that the detection seal 11 be made of the material having a higher followability than the rod seal 10, and more specifically, the material with a high elongation and a small compression set is preferably used. On the other hand, because the rod seal 10 is subjected to the high pressure in the rod side chamber 2a, it is preferable that the rod seal 10 be made of the material having a higher pressure resistance than the detection seal 11, and more specifically, the material with a high hardness and tensile strength is preferably used. In addition, because the dust seal 13 scrapes out the dusts, it is preferable that the dust seal 13 be made of the material having a higher hardness and tensile strength than the detection seal 11.

As the materials described above, for example, a fluororubber (FKM), a nitrile-butadiene rubber (NBR), a hydrogenated nitrile butadiene rubber (HNBR), and so forth are used to form the detection seal 11. The rod seal 10 and the dust seal 13 are each formed of polyurethane. As described above, the detection seal 11 and the rod seal 10 are respectively formed of different materials from each other. With such a configuration, because the detection seal 11 has a lower pressure resistance but a higher followability than the rod seal 10, it is possible to improve the detection accuracy of the fluid leakage of the fluid leakage detection device 100.

In the above, the materials used for the detection seal 11, the rod seal 10, and the dust seal 13 are not limited to those described above. For example, the rod seal 10 and the dust seal 13 may be formed of the nitrile-butadiene rubber. In this case, the detection seal 11 may also be formed of the nitrile-butadiene rubber, and the rod seal 10 and the detection seal 11 may be formed of the same material, however, it is desirable that the material of each of both components has the properties suitable for the function of the component. In other words, even if the same material (for example, the nitrile-butadiene rubber) is used, it is desirable that the detection seal 11 has the higher followability and higher elongation than the rod seal 10, and in contrast, it is desirable that the rod seal 10 has the higher hardness and tensile strength than the detection seal 11. As described above, the rod seal 10, the detection seal 11, and the dust seal 13 may be formed of the same material, and it is desirable that the material of each of these components has the properties suitable for the function of the component. In addition, it is desirable that the detection seal 11, the rod seal 10, and the dust seal 13 can respectively be used over a wide temperature range.

Next, a modification of this embodiment will be described.

In the above-mentioned embodiment, a case in which the reciprocating fluid pressure device is the hydraulic cylinder 1 has been described. The present invention is not limited thereto, and the fluid leakage detection device 100 may also be used in a damper, etc. as the reciprocating fluid pressure device. In addition, working fluid is not limited to the working oil, and for example, water or other liquid may also be used.

In addition, in the above-mentioned embodiment, the cylinder head 5 is formed of a single member. In contrast, the cylinder head 5 may have a multi-component structure formed with a plurality of members. In this case, the rod seal 10, the detection seal 11, and the dust seal 13 may respectively be provided on different members of the plurality of members forming the cylinder head 5.

In addition, in the above-mentioned embodiment, a case in which the detection seal 11 and the rod seal 10 are each the U-packing has been described. In contrast, the detection seal 11 and the rod seal 10 may also be of any type, as long as it is compressed and arranged between the piston rod 3 and the cylinder head 5 and it is capable of preventing the leakage of the working oil, and for example, an O-ring may be used.

In addition, in the above-mentioned embodiment, a case in which the detection unit is the pressure sensor 30 has been described. In contrast, the detection unit is not limited to the pressure sensor 30, and for example, the detection unit may be a sensor that detects the leakage of the working oil by detects a strained force of the detection seal 11.

In addition, in the above-mentioned embodiment, the relief pressure at which the relief valve 40 is opened is higher than the detection threshold value of the pressure sensor 30. In contrast, the relief pressure is preferably be higher than the detection threshold value of the pressure sensor 30, but at the same time, lower than a pressure at which the housing 50 that has been press-fitted to the cylinder head 5 is pulled out from the cylinder head 5. Thereby, it is possible to prevent, by the relief valve 40, the housing 50 from been subjected to a force at which the cylinder head 5 is pulled out. Therefore, it is possible to more reliably keep the fluid leakage detection device 100 attached to the cylinder head 5.

According to the embodiment mentioned above, the advantages described below are afforded.

With the fluid leakage detection device 100, the detection space 20 for detecting the leakage of the working oil is partitioned, together with the rod seal 10, by the detection seal 11 that is different from the dust seal 13. Thus, the function as the dust seal 13 is not required for the detection seal 11. In addition, even if the high-pressure working oil is leaked out through the rod seal 10, the pressure is released by the relief valve 40 that is provided in the communication passage 21. Therefore, it is possible to suppress the application of the high pressure to the detection seal 11, and the high pressure resistance is not required for the detection seal 11. As described above, because the detection seal 11 is not used as the dust seal 13 and high pressure is not applied thereto, the degree of freedom for selecting the material for the detection seal 11 is improved, and therefore, it is possible to form the detection seal 11 by using the material having the high followability. Therefore, the leakage of the working oil over the detection seal 11 is prevented, and it is possible to improve the detection accuracy of the fluid leakage detection device 100.

Configurations, operations, and effects of the embodiment according to the present invention will be collectively described below.

The fluid leakage detection device 100 for detecting the leakage of the working oil from between the piston rod 3 extending from the cylinder tube 2 and the cylinder head 5 provided on the cylinder tube 2, the piston rod 3 being inserted into the cylinder head 5, comprising: the rod seal 10 provided in the cylinder head 5, the rod seal 10 being configured to seal the annular gap 8 between the piston rod 3 and the cylinder head 5; the detection space 20 formed for detecting the leakage of the working oil; the detection seal 11 configured to seal the annular gap 8 by being provided in the cylinder head 5, the detection seal 11 being configured to partition the detection space 20 together with the rod seal 10; the communication passage 21 in communication with the detection space 20; the pressure sensor 30 configured to detect the pressure of the working oil guided through the communication passage 21; and the relief valve 40 configured to release the pressure in the communication passage 21 by being opened when the pressure in the communication passage 21 reaches the relief pressure, wherein the detection seal 11 is provided between the rod seal 10 and the dust seal 13, the dust seal 13 being configured to seal the annular gap 8 by being provided in the cylinder head 5 so as to face the outside of the cylinder tube 2.

In this configuration, the detection space 20 for detecting the leakage of the working oil is partitioned by the detection seal 11 separate from the dust seal 13 together with the rod seal 10. Thus, the function as the dust seal 13 is not required for the detection seal 11. In addition, even if the high-pressure working oil is leaked through the rod seal 10, the pressure is released by the relief valve 40 provided in the communication passage 21. Thus, it is possible to suppress the application of the high pressure to the detection seal 11, and the high durability under a high-pressure condition is not required for the detection seal 11. As described above, because the detection seal 11 is not used as the dust seal 13 and the high pressure is not exerted thereto, it is possible to form the detection seal 11 by using the material suitable for the detection of the leakage of the working oil, and so, the leakage of the working oil over the detection seal 11 is prevented. Therefore, the detection accuracy of the fluid leakage detection device 100 is improved.

In addition, in the fluid leakage detection device 100, the rod seal 10 has the higher pressure resistance than the detection seal 11.

In addition, in the fluid leakage detection device 100, the detection seal 11 has the higher elongation and the smaller compression set than the rod seal 10.

In addition, in the fluid leakage detection device 100, the rod seal 10 and the detection seal 11 are formed of different materials from each other.

In addition, in the fluid leakage detection device 100, the detection seal 11 is formed of any of the fluororubber, the nitrile-butadiene rubber, and the hydrogenated nitrile butadiene rubber.

With these configurations, because the detection seal 11 and the rod seal 10 respectively have the properties suitable for their functions, the detection accuracy of the fluid leakage detection device 100 is improved.

Embodiments of this invention were described above, but the above embodiments are merely examples of applications of this invention, and the technical scope of this invention is not limited to the specific constitutions of the above embodiments.

This application claims priority based on Japanese Patent Application No. 2018-012563 filed with the Japan Patent Office on Jan. 29, 2018, the entire contents of which are incorporated into this specification.

The invention claimed is:

1. A fluid leakage detection device for detecting leakage of working fluid from between a piston rod extending from a cylinder tube and a cylinder head provided on the cylinder tube, the piston rod being inserted into the cylinder head, the cylinder tube having a piston inserted therein to be partitioned into a rod side chamber and a counter-rod-side chamber, the fluid leakage detection device comprising:
   a rod seal provided in the cylinder head, and being configured to seal a gap between the piston rod and the cylinder head;
   a dust seal provided at a position that is farther from the rod side chamber than is a position of the rod seal in the cylinder head and being configured to seal the gap between the piston rod and the cylinder head so as to face outside of the cylinder tube;
   a detection seal provided between the rod seal and the dust seal and apart from both the rod seal and the dust seal in the cylinder head;
   a detection space formed by the gap between the piston rod and the cylinder head from the rod seal to the detection seal in the cylinder head, for detecting the leakage of the working fluid;
   a communication passage in communication with the detection space;
   a sensor configured to detect pressure of the working fluid guided through the communication passage; and
   a relief valve configured to release pressure in the communication passage by being opened when the pressure in the communication passage reaches a relief pressure, wherein
   the detection seal is made of a material different from a material of the dust seal.

2. The fluid leakage detection device according to claim 1, wherein
   the rod seal is made of a material that has a pressure resistance higher than a pressure resistance of the material of the detection seal.

3. The fluid leakage detection device according to claim 1, wherein
   the material of the detection seal has an elongation and a compression set respectively higher and smaller than an elongation and a compression sed of the material of the rod seal.

4. The fluid leakage detection device according to claim 1, wherein
   the rod seal and the detection seal are made of materials different from each other.

5. The fluid leakage detection device according to claim 1, wherein
   the detection seal is made of the material having a first followability to a material of the piston rod, and the dust seal is made of the material having a second followability to the material of the piston rod, the first followability being higher than the second followability.

6. The fluid leakage detection device according to claim 1, wherein
   the detection seal is made of any of a fluororubber, a nitrile-butadiene rubber, or a hydrogenated nitrile butadiene rubber.

7. A reciprocating fluid pressure device, comprising:
   the fluid leakage detection device according to claim 1 configured to detect leakage of working fluid from between the piston rod and the cylinder head;
   the cylinder tube;
   the piston rod extending from the cylinder tube; and
   the cylinder head provided in the cylinder tube, the piston rod being inserted into the cylinder head.

8. The fluid leakage detection device according to claim 1, wherein
   the working fluid is selectively supplied to the rod side chamber or the counter-rod-side chamber from a hydraulic pressure source.

9. A fluid leakage detection device for detecting leakage of working fluid from between a piston rod extending from a cylinder tube and a cylinder head provided on the cylinder tube, the piston rod being inserted into the cylinder head, the cylinder tube having a piston inserted therein to be partitioned into a rod side chamber and a counter-rod-side chamber, the fluid leakage detection device comprising:
   a rod seal provided in the cylinder head, and being configured to seal a gap between the piston rod and the cylinder head;
   a dust seal provided at a position that is farther from the rod side chamber than is a position of the rod seal in the cylinder head and being configured to seal the gap between the piston rod and the cylinder head so as to face outside of the cylinder tube;
   a detection seal provided between the rod seal and the dust seal and apart from both the rod seal and the dust seal in the cylinder head;
   a detection space formed by the gap between the piston rod and the cylinder head from the rod seal to the detection seal in the cylinder head, for detecting the leakage of the working fluid;
   a communication passage in communication with the detection space;
   a sensor configured to detect pressure of the working fluid guided through the communication passage; and
   a relief valve configured to release pressure in the communication passage by being opened when the pressure in the communication passage reaches a relief pressure, wherein
   the rod seal is made of a material that is different from a material of the detection seal, and
   the material of the detection seal has an elongation higher than an elongation of the material of the rod seal.

10. The fluid leakage detection device according to claim 9, wherein
    the working fluid is selectively supplied to the rod side chamber or the counter-rod-side chamber from a hydraulic pressure source.

11. The fluid leakage detection device according to claim 9, wherein
    the rod seal is made of resin, and
    the material of the detection seal is different from a material of the dust seal.

12. The fluid leakage detection device according to claim 9, wherein
    the rod seal is made of resin, and
    the rod seal and the dust seal are made of a same material.

13. A fluid leakage detection device for detecting leakage of working fluid from between a piston rod extending from a cylinder tube and a cylinder head provided on the cylinder tube, the piston rod being inserted into the cylinder head, the cylinder tube having a piston inserted therein to be partitioned into a rod side chamber and a counter-rod-side chamber, the fluid leakage detection device comprising:
- a rod seal provided in the cylinder head, and being configured to seal a gap between the piston rod and the cylinder head;
- a dust seal provided at a position that is farther from the rod side chamber than is a position of the rod seal in the cylinder head and being configured to seal the gap between the piston rod and the cylinder head so as to face outside of the cylinder tube;
- a detection seal provided between the rod seal and the dust seal and apart from both the rod seal and the dust seal in the cylinder head;
- a detection space formed by the gap between the piston rod and the cylinder head from the rod seal to the detection seal in the cylinder head, for detecting the leakage of the working fluid;
- a communication passage in communication with the detection space;
- a sensor configured to detect pressure of the working fluid guided through the communication passage; and
- a relief valve configured to release pressure in the communication passage by being opened when the pressure in the communication passage reaches a relief pressure, wherein the rod seal has a U-shape, and the detection seal is made of a material that is different from a material of the rod seal and the material of the detection seal has an elongation higher than an elongation of the material of the rod seal.

14. The fluid leakage detection device according to claim 13, wherein
the working fluid is selectively supplied to the rod side chamber or the counter-rod-side chamber from a hydraulic pressure source.

15. The fluid leakage detection device according to claim 13, wherein the material of the detection seal is different from a material of the dust seal.

16. The fluid leakage detection device according to claim 13, wherein the rod seal and the dust seal are made of a same material.

* * * * *